Figure 1A:
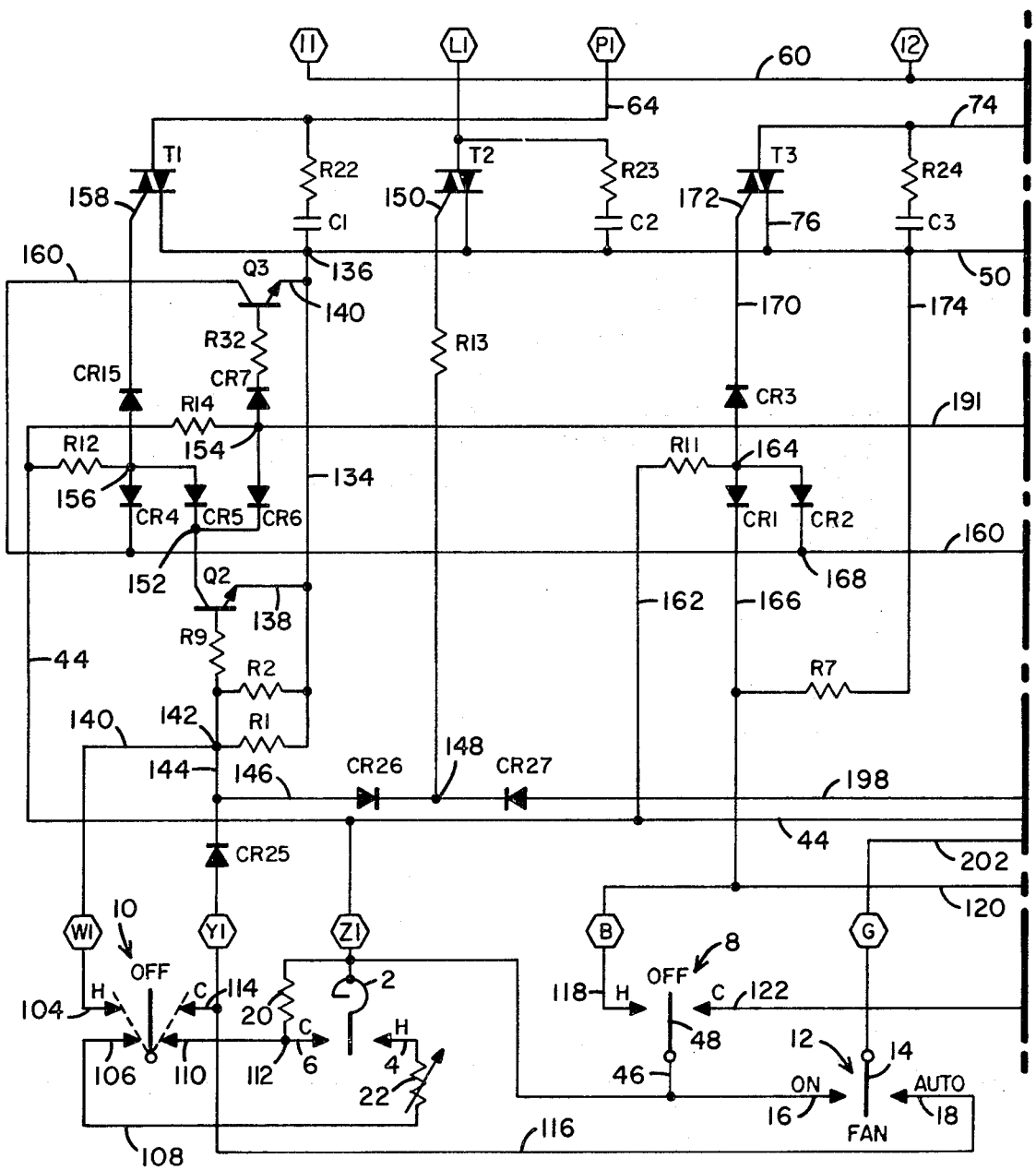

United States Patent

[11] 3,631,921

[72] Inventors Daryl R. Pedersen
Wayzata;
Charles E. White, St. Paul, both of Minn.
[21] Appl. No. 3,639
[22] Filed Jan. 19, 1970
[45] Patented Jan. 4, 1972
[73] Assignee Novatron, Inc.
St. Paul, Minn.

[54] SOLID-STATE HEATING-COOLING ZONE CONTROL SYSTEM
5 Claims, 4 Drawing Figs.

[52] U.S. Cl............................................. 165/22, 165/26
[51] Int. Cl............................................. F24f 3/00
[50] Field of Search............................ 165/22, 26, 27, 50

[56] References Cited
UNITED STATES PATENTS
2,885,187 5/1959 Myck, Jr.................. 165/22
3,386,498 6/1968 Funfstuck................. 165/26

*Primary Examiner*—Charles Sukalo
*Attorney*—Burd, Braddock & Bartz

ABSTRACT: A multizone, heating-cooling control circuit implemented with solid-state components rather than conventional relays which heretofore have been commonly used. The control circuit is designed for use in a forced air system wherein each zone is provided with dampers and motors for controlling the positioning of the dampers in accordance with the heating or cooling demand detected by a thermostat in each of the zones. A plurality of power semiconductor devices (gate-controlled triacs) are employed to connect the windings of the zone control motors, the furnace fan, the furnace gas valve and the cooling compressor across an alternating current supply. Diode-transistor logic circuits are employed to generate the gating or control signal for the triacs in accordance with the settings of the system control switch and the temperature in one or more zones.

INVENTORS
DARYL R. PEDERSEN
CHARLES E. WHITE

BY Burd, Braddock & Bartz
ATTORNEYS

INVENTORS
DARYL R. PEDERSEN
CHARLES E. WHITE
BY Burd, Braddock & Bartz
ATTORNEYS

INVENTORS
DARYL R. PEDERSEN
CHARLES E. WHITE

BY Burd, Braddock & Bartz
ATTORNEYS 3,631,921

SOLID-STATE HEATING-COOLING ZONE CONTROL SYSTEM

BACKGROUND OF THE INVENTION

Many forms of furnace control circuits are described in the prior art. In these prior art arrangements, electromechanical switching mechanisms such as electrical relays are employed to interconnect different components of the system with a power supply in accordance with control signals provided by one or more room thermostats. The present invention relates to such heating/cooling control systems but is an improvement thereover in that solid-state electronic switches are employed in place of the electromechanical relays. This offers distinct advantages in terms of reliability, service life, ease of maintenance and cost. In the preferred embodiment of the invention gate-controlled triacs, which are functionally bidirectional semiconductor switching devices, are employed in place of relays found in prior art systems. Triacs elements are commercially available. The triac was first described in a paper appearing in the Journal of Applied Physics, Vol. 30, number 11, dated Nov. 1959, entitled "Two Terminal Asymmetrical and Symmetrical Silicon Negative Resistance Switches" by R. W. Aldrich and N. Holonyak, Jr., and further information concerning their construction and mode of operation can be obtained from that source.

Control over the firing of the triacs is determined by a novel diode-transistor logic network. The network receives input signals from master and slave thermostats located in the building whose environmental temperature is to be controlled. The logic circuit combines these signals to provide the proper triac gating signals to permit conduction of the triacs and proper energization of the zone control motors, the furnace fan, the furnace gas valve or the air conditioning compressor.

It is accordingly the principal object of this invention to provide a novel multizone heating/cooling system control network.

It is another object of the invention to provide a novel control network for a multizone heating/cooling system wherein solid state components are used throughout.

Figure 1B:
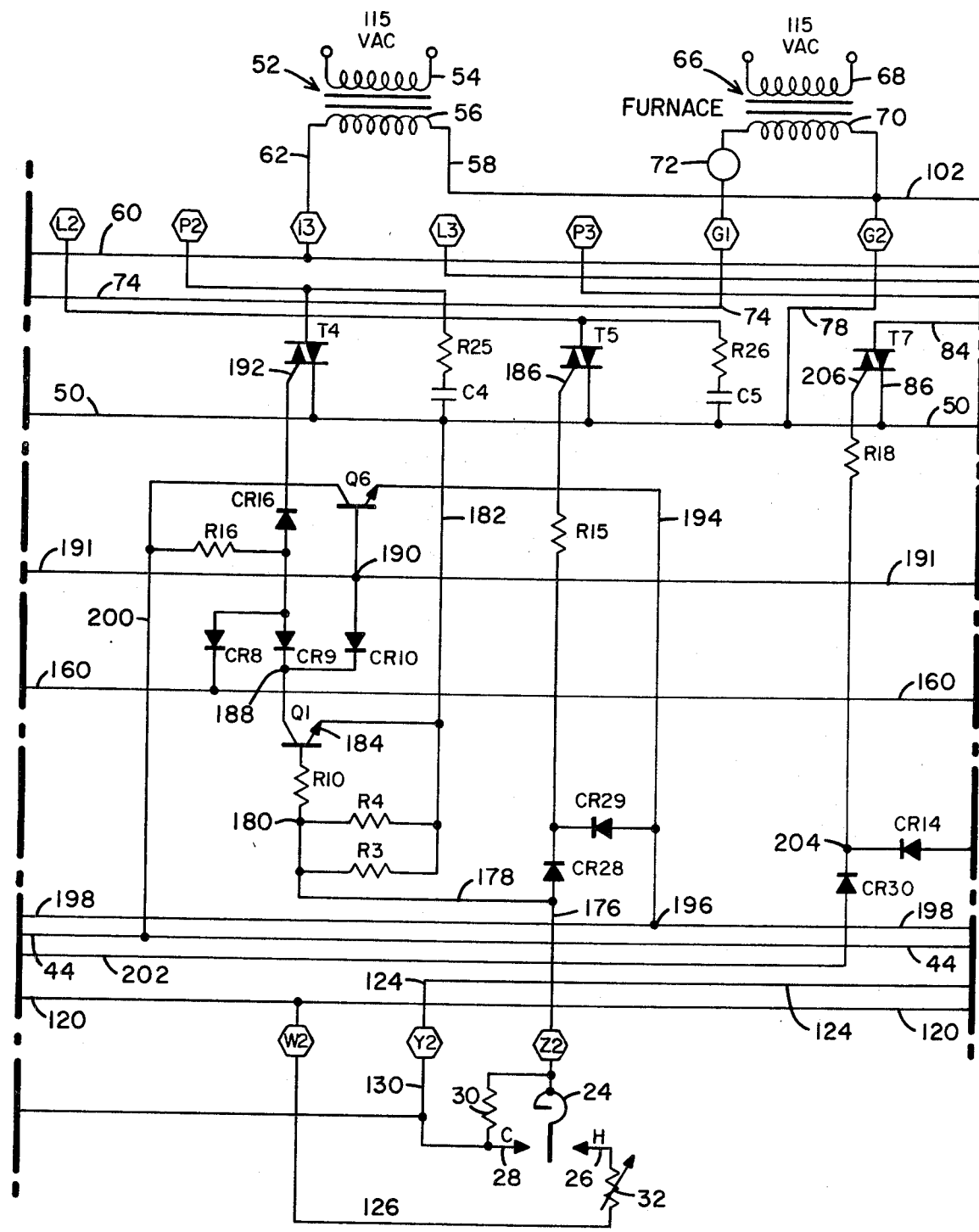
Figure 1C:
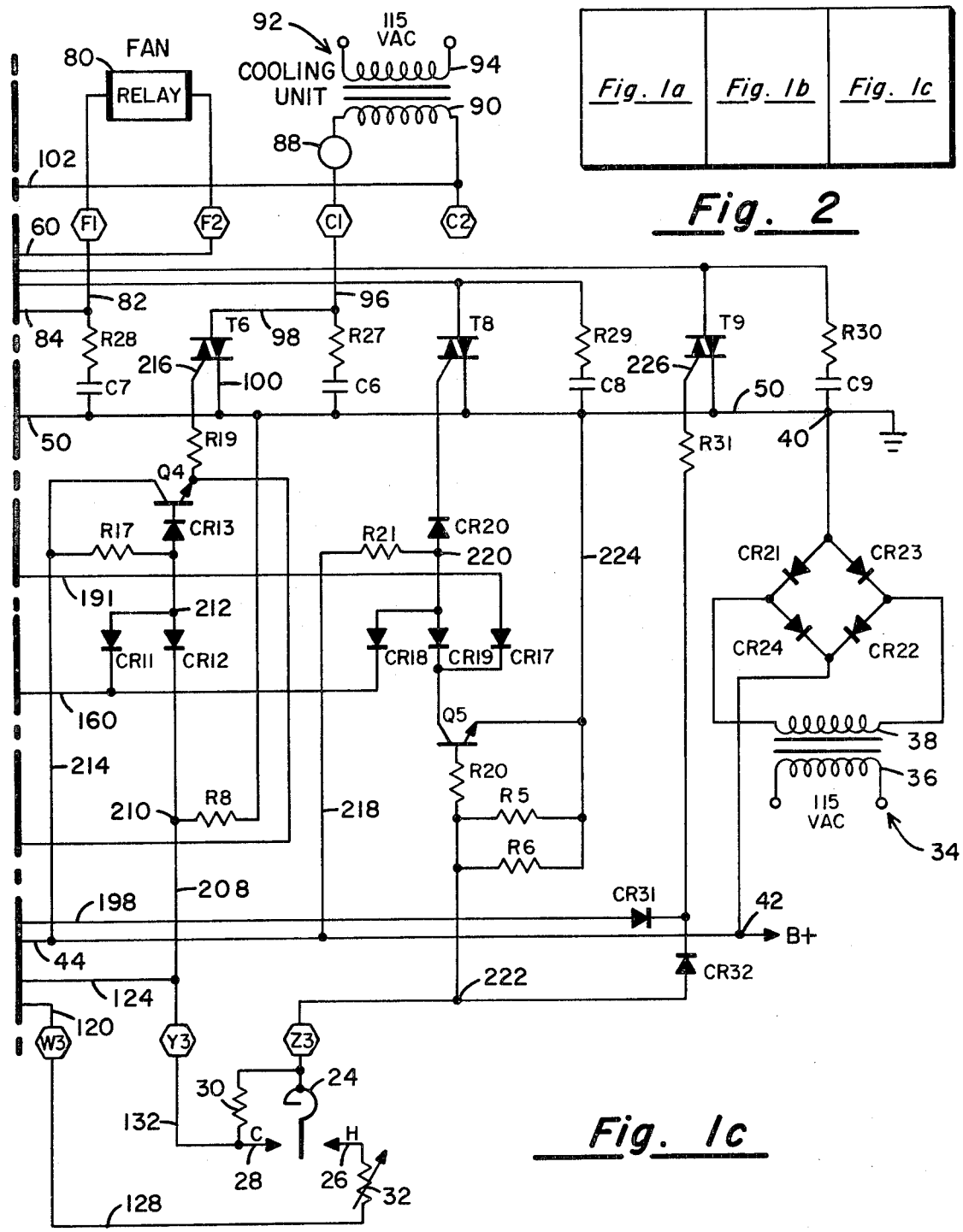

These and other objects, features, and attendant advantages of the invention would be appreciated more readily as the same become better understood by reference of the following detailed description when considered in connection with the accompanying drawings in which:

FIGS. 1a, 1b and 1c illustrate by means of a schematic diagram the preferred embodiment of the invention; and FIG. 2 illustrates the manner in which the drawings of FIGS. 1a through 1c are arranged to provide a composite view.

Before describing the operation of the circuit of FIG. 1, consideration will first be given its construction.

Shown at the bottom of FIG. 1a is a schematic representation of a master thermostat. In the preferred embodiment, the master thermostat may comprise a Honeywell Type T87F unit having a Type Q539A subbase while the slave thermostats (FIGS. 1b and 1c) comprise only the Type T87F unit. The thermostat is shown to include a bimetallic element 2 which when subjected to a change in temperature moves to the right or left depending upon whether the temperature is falling or rising, respectively. Associated with the bimetallic strip 2 are a pair of contacts 4 and 6 which may be termed the heating contact and the cooling contact respectively. Included in the master thermostat (FIG. 1a) is a manually operated system control switch which, when set, determines whether the system will be in a heating or a cooling mode. The system control switch includes a first single pole three-position switch indicated generally by the numeral 8 and a three-position shorting linkage type switch indicated generally by numeral 10. While in FIG. 1a, the switches 8 and 10 are shown as separate, in practice they are ganged and caused to operate by the same switch mechanism. The master thermostat further includes another single pole, double throw switch 12 which is the "fan control" switch. The arm 14 of this switch is movable between a pair of contacts 16 and 18. When the arm 14 and contact 16 are made, the fan is in a continuous run or "on" condition. However, when switch arm 14 mates with contact 18, the fan is in an "automatic" condition as will be described further hereinbelow. A pair of heaters 20 and 22 termed anticipators are included in the thermostat and serve to limit room temperature overshoot in either the heating or the cooling mode.

At the bottom of FIGS. 1b and 1c are shown the slave-type thermostats employed in the several zones comprising the system. These slave thermostats differ from the master thermostat in that they do not include a system control switch 8, 10, or a fan control switch 12. All that is included is the bimetal element 24, a heating contact 26, a cooling contact 28, and the anticipators 30 and 32.

Referring now to FIG. 1c, there is shown a power supply for the control circuit. This power supply includes a transformer 34 having a primary winding 36 and a secondary winding 38. The primary winding is adapted to be connected to a source of alternating current voltage at line potential and the transformer 34 steps the voltage down to a desired level or value. Also included in the power supply is a diode rectifier bridge including the semiconductor diodes CR21 through CR24. The bridge acts in a conventional manner to provide full wave rectified DC voltage between the ground terminal 40 and the B+ terminal 42. The B+ terminal 42 of the power supply is connected by a bus 44 to a terminal Z1 (FIG. 1a). The bimetal strip 2 of the master thermostat is connected to terminal Z1 as is the switch contact 16 of the fan switch 12. A conductor 46 connects the switch arm 48 of the system control switch 8 to the terminal Z1 also. Finally, the anticipator heater element 20 is connected between the thermostat cooling contact 6 and the B+ terminal Z1.

The ground terminal 40 is connected by a bus 50 to a first terminal of a plurality of bidirectional semiconductor switching elements or triacs T1 through T9. Triacs T1 and T2 are associated with zone 1 and respectively determine whether the damper motor for that zone will close or open. The triac T3 controls the furnace gas valve. Triacs T4 and T5 control the damper motor for zone 2. Triac T6 controls the air conditioning compressor. Triac T7 controls the fan while triacs T8 and T9 control the damper motor in zone 3. Of course, it is possible to add additional zones into the system by adding additional damper motors and triacs in accordance with the organization depicted in the drawings. To add additional zones is felt to be well within the realm of ordinary skill in the art provided one is familiar with the teachings of the present application.

The energy source for the damper motors comprises the transformer 52 which has a primary winding 54 adapted to be connected to a source of line potential and a secondary winding 56 connected between the ground bus 50 by a conductor 58 and a common bus 60 by a conductor 62. The damper control motors for each of the zones is preferably a reversible alternating current motor and while not shown in the figures, would be connected to the terminals I1, L1, and P1 in such a fashion that when triac T1 is conducting current would flow from the secondary winding 56 through conductor 62 and bus 60 through the motor winding, terminal P1, a conductor 64, triac T1 to ground bus 50 to which the other side of the secondary winding 56 is connected by way of conductor 58. The current flow through the motor winding along this path causes the motor to turn in a direction to close the damper, with suitable limit switch means being utilized to control the extent of drive.

When triac T2 is conducting, alternating current flows from the transformer secondary winding 56 to terminal I1 and from there through the motor winding to terminal L1 and through triac T2 and ground bus 50 back to the other side of the winding 56. The current flowing through the motor winding connected between terminals I1 and L1 causes the damper motor to turn in a direction causing the damper to open. While the hookup of the damper motor for zone 1 has been described in detail, it is felt unnecessary to repeat this explanation for the damper motors in zones 2 and 3 for they are connected in a similar fashion to the terminals L2, P2, and I2, and L3, P3, and I3.

As mentioned above, the triac T3 controls the energization of the furnace gas valve. More specifically, a transformer 66 having a primary winding 68 connected to a source of line potential induces a voltage of a desired value in the secondary winding 70 thereof. The gas valve 72 is connected in a series circuit with the secondary winding 70, a terminal G1 and the triac T3 by a conductor 74. The other side of the triac T3 is connected by conductor 76 to the ground bus 50 which is connected to the other side of secondary winding 70 by way of conductor 78 and terminal G2. Thus, when triac T3 is conducting, a low impedance path including the gas valve 72 is established across the secondary winding 70 of transformer 66.

In much the same fashion, the triac T7 controls the energization of the fan relay 80. Specifically, the secondary winding 56 of transformer 52 is connected by way of conductor 60 to one side of the relay 80. The other terminal of relay 80 is connected to a terminal F1 which is connected by conductors 82 and 84 to one side of the triac T7. A conductor 86 joins the other side of triac T7 to the ground bus 50 which is returned to the remaining terminal of the secondary winding 56 by way of conductor 58. When triac T7 is conducting, current flows from the secondary winding of transformer 52 through the relay 80 and triac T7 to energize the fan relay.

The air conditioning compressor 88 is connected in a series circuit with a secondary winding 90 of a transformer 92 whose primary winding 94 is connected to a source of line potential. Also connected in series with the secondary winding 90 and air conditioning compressor motor 88, is a terminal C1, conductors 96 and 98, triac T6, a conductor 100, the ground bus 50 and conductor 78 which is, in turn, connected to the secondary winding 90 by a conductor 102. When triac T6 is nonconducting, a high impedance is presented to the flow of current through this path so that the compressor will remain off. However, when the triac T6 is turned on by a suitable control signal applied to its gate electrode, a low impedance exists in the above-described series circuit and the compressor motor will be energized.

Referring again to FIG. 1a, it will be seen that a contact 104 of the master thermostat is connected to a terminal W1 while a contact 106 is connected by a conductor 108 to a terminal of heater 22. Furthermore, a contact 110 of switch 10 is connected to the junction 112 between the cooling contact 6 and the anticipator heater 20. A cooling contact 114 is connected to a terminal Y1 and also to the auto switch contact 18 by means of a conductor 116.

The system function switch 8 has its heating contact 118 connected to a terminal B and to terminals W2 and W3 by a conductor 120. The cooling contact 122 of switch 8 is connected to a terminal Y2 and a terminal Y3 by a conductor 124.

The switch arm 14 of the fan control switch 12 is connected to a terminal G. A conductor 126 connects the terminal W2 to the series combination of the heater 32 and the heating contact 26 of the slave thermostat for zone 2. In a similar fashion, a conductor 128 connects the terminal W3 to the series combination of heating contact 26 and anticipator heater 32 of the thermostat for zone 3. The cooling contact 28 of zones 2 and 3 are respectively connected to the terminals Y2 and Y3 by a conductor 130 and 132. The bimetal elements of the thermostats for zones 2 and 3 are connected to terminals Z2 and Z3 respectively.

Now that the external connections to the control circuit of this invention have been described, consideration will be given to the organization of the diode-transistor logic circuits used to develop the gating signals for the plurality of triacs used in the system.

Referring to FIG. 1a, a conductor 134 connects to the ground bus 50 at junction 136. A pair of NPN transistors Q2 and Q3 have their emitter electrodes connected to the grounded conductor 134 by conductors 138 and 140. The base of transistor Q2 is coupled through a resistor R9 and a diode CR25 to the terminal Y1. A conductor 140 connects the terminal W1 to the junction 142 between resistor R9 and diode CR25 and a pair of resistors R1 and R2 are connected between this junction and the ground conductor 134. The junction 142 is also connected by means of conductors 144 and 146 and a diode CR26 to a junction 148. Junction 148, in turn, is coupled through a resistor R13 to the gate electrode 150 of triac T2.

The collector electrode of transistor Q2 is connected to a junction 152 to which a pair of diodes CR5 and CR6 are connected. The other terminal of diode CR6 is connected to a junction 154 between a first terminal of a resistor R14 and an additional diode CR7. The remaining terminal of resistor R14 is connected to the B+ bus 44 and the other terminal of the diode CR7 is coupled through a resistor R32 to the base electrode of transistor Q3.

A resistor R12 is connected between the bus 44 and the remaining terminal of the diode CR5. This junction point is identified by numeral 156. The junction 156 is coupled through a diode CR15 to the gate electrode 158 of triac T1.

The collector electrode of transistor Q3 is connected by a conductor 160 to the anode electrode of a diode CR4 whose cathode is connected to the junction 156.

The B+ bus 44 is coupled by means of a conductor 162 and a resistor R11 to a junction point 164 to which the cathode electrodes of diodes CR1, CR2 and CR3 are commonly connected. The anode electrode of diode CR1 is connected by a conductor 166 to the terminal B (FIG. 1a). The anode electrode of diode CR2 is connected to the conductor 160 at junction 168. The anode electrode of diode CR3 is connected by a conductor 170 to the gate electrode 172 of triac T3. A resistor R7 is connected between the conductor 166 and the ground bus 50 by a conductor 174.

Referring now to FIG. 1b, it will be seen that the terminal Z2 is connected by conductors 176 and 178 to a junction 180. Connected between the junction 180 and a ground conductor 182 are a pair of paralleled resistors R3 and R4. Also connected to the grounded conductor 182 is the emitter electrode 184 of a transistor Q1 whose base is coupled through a resistor R10 to the junction 180. The terminal Z2 is connected by means of conductor 176 and a diode CR28 and a resistor R15 to the gate electrode 186 of triac T5. The collector electrode of transistor Q1 is connected to a junction 188 to which the anode electrodes of a pair of diodes CR9 and CR10 are connected. The cathode of CR10 is connected to a junction 190 to which the base electrode of a transistor Q6 is directly connected. The cathode electrode of diode CR9 is coupled through a diode CR16 to the gate electrode 192 of triac T4. The emitter electrode of the transistor Q6 is connected by a conductor 194 to a junction point 196 on a bus 198. The bus 198 connects to the cathode of a diode CR27 (FIG. 1a) whose anode is coupled to the junction point 148.

The collector electrode of transistor Q6 is connected by a conductor 200 to the B+ bus 44. A resistor R16 is bridged between the conductor 200 and the junction formed by the common connection of the cathodes of diodes CR8, CR9 and CR16.

Continuing on with a detailed description of the manner in which the components forming the control circuit are interconnected, a conductor 202 connects the terminal G to which the fan switch 12 is connected through a diode CR30 to a junction 204. The junction 204 is coupled through a resistor R18 to the gate electrode 206 of the triac T7. The terminal Y3 is connected by a conductor 208 to a junction 210. Coupled between junction 210 and the ground bus 40 is a resistor R8. Also coupled to the junction 210 is the anode of a diode CR12 whose cathode is connected in common with the cathode of a diode CR11 to a junction 212. The anode of diode CR11 connects to the collector of transistor Q3 by way of the conductor bus 160. Junction 212 is coupled to the base electrode of a transistor Q4 through a diode CR13. The collector electrode of the transistor Q4 is connected by a conductor 214 to the positive bus 44. The emitter electrode of transistor Q4 is coupled through a resistor R19 to the gate electrode 216 of triac T6 and through a diode CR14 and the resistor R18 to the gate electrode 206 of triac T7.

The positive bus 44 is coupled by a conductor 218 and a resistor R21 to a junction 220. This junction is coupled through a diode CR20 to the gate electrode of the triac T8. A diode CR18 has its cathode connected to the junction 220 and its anode connected to the conductor bus 160.

The terminal Z3 (FIG. 1c) is connected to a junction 222. This junction is coupled through a resistor R20 to the base electrode of a NPN transistor Q5, whose emitter electrode is connected to the ground bus 50 by way of a conductor 224. Connected between conductor 224 and the junction 222 are a pair of resistors R5 and R6. The collector electrode of transistor Q5 is coupled through a diode CR19 to the junction 220. Junction 220, in turn, is coupled through diode CR20 to the gate electrode of triac T8. The collector electrode of transistor Q5 is also coupled through a diode CR17 to the junction 190. Finally, the terminal Z3 is connected through a diode CR32 and a resistor R31 to the gate electrode 226 of triac T9. The gate electrode 226 is also coupled through a diode CR31 to the junction 196 connected to the emitter of transistor Q6.

Now that the detailed organization of the preferred embodiment has been described in detail, consideration will be given to its operation.

OPERATION-HEATING MODE

As an initial condition, let it be assumed that the dampers are all in the open position, the system control switch 8 and 10 is in the "heat" position but that no zones are calling for heat. With alternating current connected to the primary windings of the transformers 34, 52, 66, and 92, the system will be ready to function. Specifically, a rectified DC voltage will be impressed across the terminals 40 and 42 such that a positive voltage will appear on the B+ bus 44. Because under the assumed conditions transistors Q1, Q2, and Q5 are nonconducting, this positive signal is applied through the resistor R14 to the junction 154 and through diode CR7 and R32 to maintain transistor Q3 conductive. With transistor Q3 conducting, ground potential will be applied by way of conductor 140 and the emitter-to-collector path of transistor Q3, the conductor 160 to the junction 168. This ground or low signal will be coupled through diode CR2 and CR3 to the gate electrode 172 of triac T3 to insure that triac T3 does not conduct. With triac T3 nonconducting, a high impedance is included in the path containing the gas valve and the gas remains off. Specifically, insufficient current will flow because of the high impedance presented by triac T3 to allow energization of the gas valve 72. Under the assumed conditions, this is proper operation since it has been assumed that no zone is calling for heat.

The positive signal appearing at junction 154 to maintain transistor Q3 conducting is also applied to the junction 190 so that transistor Q6 will also be conducting at this time. With transistor Q6 in its conductive state, the B+ voltage appearing on bus 44 will be applied by way of conductor 200 and the collector-to-emitter path of transistor Q6 and the conductor 194 to junction 196 on conductor 198. This positive signal is coupled by diode CR27 and resistor R13 to the gate electrode 150 of triac T2. Similarly, this positive signal will be coupled through diode CR29 and resistor R15 to the gate electrode of triac T5. Further, the positive signal on the conductor 198 which exists by virtue of the fact that transistor Q6 is conducting also is coupled through diode CR31 and resistor R31 to the gate electrode 226 of triac T9. With the gate electrodes of triacs T2, T5 and T9 all positively biased, these triacs will be conductive and, as mentioned earlier, the reversible AC damper control motors will be operated to maintain the dampers in the open position.

Next it is to be assumed that the fan switch 12 is moved to the "on" position, i.e., switch arm 14 is mated with contact 16. With this assumption prevailing, it will be seen that a positive voltage appearing on bus 44 will be coupled through the terminal Z1 and through the fan switch 12 and terminal G and conductor 202 and diode CR30 to the junction 204. This positive signal is coupled through resistor R18 to the gate electrode 206 of the triac T7. The effect of this bias voltage is to force the triac into its conducting state. As a result, the fan relay 80 will be effectively connected directly across the secondary winding 56 of transformer 52, all as previously described.

Next, it is to be assumed that the fan control switch is moved to the automatic ("auto") position, i.e., contact arm 14 mating with contact 18 and further that the thermostat 2 in zone 1 is calling for heat. When the bimetal strip 2 mates with the heating contact 4, a positive voltage from the B+ bus 44 will be applied through terminal Z1, the bimetal strip 2, the heater element 22, conductor 108, the switch arm 10 bridging contacts 104 and 106 such that terminal W1 is at approximately B+ potential. This potential is applied to the junction 142 by way of conductor 140 and causes the transistor Q2 to be forward biased and turned on. With transistor Q2 conducting, ground potential appearing on conductor 134 will be coupled through the transistor to the junction 152. A current flows through R14, CR6, and Q2 with the voltage drop across R14 causing a low potential at junction 154. This low signal coupled through diode CR7 and resistor R32 to turn off the transistor Q3. As a result, ground potential will be removed from the conductor 160 and, instead, a high potential will be applied thereto by way of the resistor R17 and the diode CR11. With the conductor 160 at a high potential, this signal will be coupled through the diodes CR2 and CR3 to the gate electrode 172 of triac T3, thus causing the triac T3 to assume its low impedance state. The alternating current voltage induced in the secondary winding 70 will flow through the gas valve 72 through conductor 74 through the triac T3, through conductors 50 and 78 to energize the gas valve so that the burner can be ignited.

The fan switch has been assumed to be in the "auto" position. Because transistor Q2 is conducting, the B+ voltage on bus 44 will be dropped across R12 and the junction 156 will be at a low potential and accordingly triac T1 will be in its high impedance state. Because of the B+ voltage appearing at terminal W1 under the assumed conditions, this high signal will be coupled through the diode CR26 and resistor R13 to the gate electrode 150 of triac T2. Hence, triac T2 will be fully conductive and the damper motor for zone 1 will be maintained in its opened position.

It has also been shown that transistor Q3 will be off at the time that zone 1 calls for heat. With transistor Q3 nonconducting, the conductor 160 will be at a relatively high potential and as a result, this high signal will be coupled through diodes CR8 and CR16 to turn on triac T4. As has been mentioned above, the energization of triac T4 causes a current to flow through the zone 2 damper motor in such a fashion so as to effect a closure of the damper. Similarly, the high signal appearing on conductor 160 is coupled through diodes CR18 and CR20 to the gate electrode of triac T8. The effect of this is to energize the winding of the damper motor for zone 3 in such a fashion that the damper is closed. Hence, it can be seen that under the assumed conditions, the gas valve will be turned on, zone 1 which is the zone which called for heat, will have its damper remain open while the dampers for zones 2 and 3 will be driven to their closed position. The fan will be energized by the furnace fan relay.

To insure that the zone 2 and 3 damper motors will remain closed, it is necessary that triacs T5 and T9 nonconducting. Because transistor Q2 is driven on when zone 1 calls for heat, a low signal will be coupled through the transistor Q2 and the diode CR6 to the junction 154. This potential level also appears at the junction 190 causing transistor Q6 to be nonconducting. With transistor Q6 nonconducting, and with diodes CR29 and CR31 being coupled to the gate electrodes 186 and 226, triacs T5 and T9 remain off.

HEATING MODE—ZONE 1 AND ZONE 3 DEMANDING HEAT

Now let it be assumed that while zone 1 continues to demand heat, that zone 3 also demands heat. Under this assumption, when the bimetal switch 24 in zone 3 thermostat moves against the heating contact 26, a positive voltage from the bus 44 will be coupled from terminal Z1 by way of conductor 46, system switch 8, conductor 120, conductor 128, anticipator heater 32, the switch contact 26 so as to appear at terminal Z3. The high signal coupled through diode CR32 and resistor R31 is applied to the gate electrode 226 of triac T9 causing triac T9 to conduct. The effect of this is to couple the motor winding between terminal L3 and terminal I3 directly across the secondary winding 56 of the transformer 52. Energization of this winding will cause the damper motor to open the damper in zone 3. The high potential at terminal Z3 also causes transistor Q5 to become conductive, thereby grounding the anodes of diodes CR19 and CR17 by way of conductor 224 and the emitter-to-collector path of transistor Q5. The low potential appearing at junction 220 is coupled by way of diode CR20 to the gate electrode of triac T8. This insures that triac T8 will remain off so that no current will flow through the winding which tends to rotate the damper motor in a direction to close the damper.

Transistor Q6 remains off because of the low potential level along conductor 134, conductor 138, transistor Q2 and diode CR6 to the junction 190. With transistor Q6 nonconducting, the signal appearing on conductor 194 will remain low and this low potential is coupled by diode CR29 and resistor R15 to the gate electrode 186 of triac T5. Therefore, triac T5 remains nonconducting and the damper motor for zone 2 remains in its closed condition. At the same time, transistor Q1 is nonconducting such that the junction between diodes CR8, CR9 and R16 remains relatively high, and this B+ signal is coupled through resistor R16 and the diode CR16 to the gate electrode 192 of triac T4. The positive signal at electrode 192 insures that triac T4 will be conducting and the damper motor for zone 2 will have its windings energized so as to urge the damper to its closed position.

With the operation as it has been thus far described, it is believed unnecessary to explain the details of operation resulting when the thermostat for zone 2 should sense the need for heat. The operation is totally similar to the operation described in connection with zone 3 and need not be repeated.

COOLING MODE

To convert the control circuit of the present invention to operate in controlling an air conditioning compressor, the system switch 8, 10 is manually moved to the "cool" position, i.e., with switch arm 48 mating with contact 122 and the linkage moved to bridge contact 110 to contact 114. Under these circumstances, the circuit will remain dormant until one of the zones calls for cooling. As an initial condition, let it be assumed that the dampers in all three zones are in their closed position and that no zone is calling for cooling. With these assumptions existing, no potential will be applied to the base electrode of transistor Q2 and it will be nonconducting. As a result there will be no voltage drop across the resistor 14 due to the fact that zones 2 and 3 are also satisfied such that transistors Q1 and Q5 are nonconducting. With no voltage drop across resistor R14, junction 154 will be high and transistor Q3 will be forward biased and will be heavily conductive. When transistor Q3 is conducting, the bus 160 is effectively connected to ground potential by way of transistor Q3 and the conductor 134 connected to ground bus 50 at junction 136.

Because bus 160 is grounded, current will flow from the B+ bus 44 through resistor R12 and diode CR4 so that junction 156 will be at a relatively low potential. A low potential at this terminal reverse biases the triac T1 which disables the triac and removes the energization from the damper motor winding which tends to close the zone 1 damper.

As was mentioned above, with transistor Q2 nonconducting, the junction 154 will be at a relatively high potential as will the junction 190 which is connected to junction 154 by conductor 191. The high potential at junction 190 causes transistor Q6 to be forward biased and conducting. Hence, a positive potential from the B+ bus 44 will be applied by way of conductors 200 and 194 and 198 to the diodes CR27, CR29, and CR31. The positive signal is coupled through these diodes and the resistors R13, R15, and R31 to the gate electrodes of triacs T2, T5 and T9. Hence, the zone control motors for zones 1, 2 and 3 will have their windings energized by alternating current supplied by the transformer 52 so as to cause the dampers to be moved to an open position. Thus, as soon as the master thermostat has the system function switch moved to the "cool" position the dampers for each of the zones will automatically be opened preparatory to the initiation of the air conditioning compressor if no zone is calling for cooling.

With transistor Q3 conducting, a current path is established from the positive bus 44 through conductor 162 and resistor R11 and through diode CR2 and conductor 160 to the grounded conductor 134. This maintains the junction point 164 a a low potential and reverse biases the triac T3. Hence, the furnace gas valve will be disabled as it should be when the heating/cooling system is operating in a cooling mode. In a similar fashion, a current from the B+ supply through conductor 214 and resistor R17 and through diode CR11 to the presently grounded bus 160 maintains junction 212 at a low potential such that transistor Q4 is nonconducting. With transistor Q4 nonconducting, the triac T6 is nonconducting and the air conditioning compressor is accordingly isolated from the secondary winding of transformer 92. Similarly, with transistor Q4 nonconducting, no base drive current for triac T7 will be applied through diode CR14. Assuming that the fan switch 12 is in its midposition, no base drive current for the triac T7 will be available and hence it will remain nonconducting. As such, the fan relay 80 is isolated from the alternating current supplied by the secondary winding 56 of transformer 52.

From the description thus far, it can be seen that when the system function switch is in the "cool" position with all of the zones satisfied, the control circuits will operate the triacs in such a fashion that the dampers for all three zones will be opened, the gas valve will be disabled, the compressor will be disabled, and the fan will be disabled.

If it is next assumed that the fan switch 12 is moved to its "on" position with switch arm 14 mating with contact 16, the current will flow from the B+ supply through bus 44, terminal Z1, the switch contacts 16-14 to terminal G. From there, the current will flow through conductor 202 and diode CR30 to junction 204. This provides the requisite base drive current for triac T7 to drive it to its conductive state. With triac T7 conducting, the fan relay 80 will be connected across the secondary winding 56 of transformer 52 and will be energized. However, if the switch 14 is now moved to the "auto" position, this flow of current will be interrupted and the fan will be deenergized.

To further understand the operation of the circuit of this invention, let it be assumed that the thermostat in zone 2 (FIG. 1b) calls for cooling. Under these circumstances, the bimetal element 24 will mate with the cooling contact 28 in zone 2. As a result, current will flow from the positive bus 44 through terminal Z1 (FIG. 1a) through conductor 46 through contacts 48 and 122, through conductor 124 and 130, and through the bimetal element 24 and conductor 176 to forward bias the transistor Q1 rendering it conductive. With transistor Q1 conducting, junction 188 will be at a low potential and a current will flow through the positive bus 44, resistor R14 (FIG. 1a) and conductor 191 to junction 190 and from here, through diode CR10 and through transistor Q1 to the grounded conductor 182. The voltage drop across resistor R14 causes junction 190 to assume a low potential and transistor Q6 is turned off. With transistor Q6 turned off, the positive voltage is removed from the diodes CR27, CR29 and CR31. It is to be recalled that it was a positive signal applied to these last-mentioned diodes that caused the damper motors in all of the zones to assume an open position. The positive signal appearing at terminal Z2 when zone 2 is calling for cooling is coupled through diode CR28 and resistor R15 to turn on the triac T5. Since triac T5 is conducting, the damper motor in zone 2 will continue to hold the damper in an open position.

In certain instances, it may be desirable to slave certain damper motors together to insure adequate airflow over the evaporator coils during the cooling operation whenever only one zone is calling for cooling. Also, the system may be modified so as to permit the compressor and fan to be energized only when more than one zone is calling for cooling. While it may appear strange that the air conditioning compressor and fan will not come on even though one of the zones is calling for cooling, the reason for this is that with only one zone operating, insufficient air passes over the evaporator coils in the air conditioning unit and icing can occur.

Now let it be assumed that zone 1 calls for cooling. As such, the bimetal element 2 will move against the "cool" contact 6 in the thermostat for zone 1 (FIG. 1a) and the B+ voltage is applied to terminal Y1. Current now flows through diodes CR25, CR26 and resistor R13 to forward bias the triac T2 to insure that the damper for zone 1 is opened. The positive signal at terminal Y1 also forward biases transistor Q2 turning it on. With transistor Q2 conducting, junction 152 is at ground potential and a current now flows from the positive bus 44 through resistor R14, junction 154, diode CR6 to the grounded junction 152. This lowers the potential at junction 154 causing transistor Q3 to be turned off. The current from the positive bus 44 through resistor R12 and diode CR5 causes the potential at junction 156 to drop such that a reverse bias is applied to triac T1. This has the effect of disabling the winding of the zone 1 damper motor which would effect closure of the damper.

Because of the foregoing detailed explanation, it is felt to be well within the realm of ordinary skill in the art for one to analyze the operation of the circuit of this invention when it is assumed that zone 3 is calling for cooling. Hence, it is deemed unnecessary to explain this mode of operation in detail since it is substantially the same as already set forth in connection with the operation of zone 2.

Having described the preferred embodiment of the present invention, it is believed obvious that other modifications and variations of the present invention are possible in light of the above teachings.

What is claimed is:

1. In a multizone forced air heating/cooling system of the type including duct work leading to a plurality of zones each having temperature-responsive switching means located therein, a gas-fired furnace having an electrically operated gas valve, a relay-controlled fan motor, an air conditioning unit including a motor-driven compressor, and a plurality of motor-driven dampers in said duct work for controlling the flow of air to said zones, a solid-state control system comprising:
   a. A first, second and third semiconductor gate controlled switching devices each having a pair of load terminals and a gate terminal;
   b. means connecting said pair of load terminals of said first, second and third switching devices individually in series circuit with a source of alternating current and said gas valve, said relay and said motor-driven compressor;
   c. a plurality of pairs of semiconductor gate controlled switching devices each having a pair of load terminals and a gate terminal, said load terminals connected in series circuit with said source of alternating current and said plurality of damper motors, such that when one of said pair of switching devices is conducting said motors moves in a first direction and when the other of said pair of switching devices is conducting, said motors move in an opposite direction; an
   d. means connected to said temperature-responsive switching means in each of said zones and coupled to said gate electrodes on said first, second third and said plurality of pairs of semiconductor gate-controlled switching devices for controlling the conduction thereof in accordance with the setting of said temperature-responsive switching means.

2. Apparatus as in claim 1 wherein said last-mentioned means comprises semiconductor current control devices each having a control electrode and a pair of output electrodes associated with each of said zones;
   means connecting the temperature-sensitive switching means for each of said zones to the control electrode of the semiconductor current control means associated with that zone; and
   means connecting the pair of output electrodes between said source of direct current potential and the gate electrode of said pairs of semiconductor gate-controlled switching devices.

3. Apparatus as in claim 2 wherein said semiconductor current control means are transistors and where said last-named means includes diode logic gating means.

4. Apparatus as in claim 1 wherein said semiconductor gate-controlled switching devices are triacs.

5. Apparatus as in claim 1 wherein said temperature-sensitive switching means for each of said zones comprises a bimetal switch thermostat.

* * * * *